US006381638B1

(12) United States Patent
Mahler et al.

(10) Patent No.: US 6,381,638 B1
(45) Date of Patent: Apr. 30, 2002

(54) SYSTEM AND METHOD FOR OPTIONS BASED ADDRESS REUSE

(75) Inventors: Jerry J. Mahler, Prospect Heights; Michael S. Borella, Naperville; David Grabelsky, Skokie; Ikhlaq S. Sidhu, Vernon Hills, all of IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/256,390

(22) Filed: Feb. 24, 1999

(51) Int. Cl.[7] .............................................. G06F 17/30
(52) U.S. Cl. ........................ 709/220; 709/203; 370/355
(58) Field of Search .......................... 707/10, 4, 9, 100; 709/203, 220, 224, 226; 370/355, 356

(56) References Cited

U.S. PATENT DOCUMENTS

| 5,754,547 A | * | 5/1998 | Nakazawa ................... 370/401 |
| 5,835,723 A | * | 11/1998 | Andrews et al. ............ 709/226 |
| 5,862,331 A | * | 1/1999 | Herriot ........................ 709/219 |
| 5,872,847 A | * | 2/1999 | Boyle et al. ................. 713/151 |
| 6,055,236 A | * | 4/2000 | Nessett et al. .............. 370/389 |
| 6,185,184 B1 | * | 2/2001 | Mattaway et al. .......... 370/230 |
| 6,212,563 B1 | * | 2/2001 | Beser ......................... 709/227 |
| 6,212,183 B1 | * | 4/2001 | Wilford ...................... 370/392 |
| 6,249,820 B1 | * | 6/2001 | Dobbins et al. ............ 709/238 |

OTHER PUBLICATIONS

G. Montene, Internet Engineering Task Force, Internet Draft, "Negotiated Address Reuse" (NAR), <draft–montenegro–aatn–nar–00.txt>, May 1998, pp. 1 to 22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998 pp. 1 to 5.

George Tsirtsis, Pyda Srishuresh, Internet Engineering Task Force, Internet Draft, "Network Address Translation—Protocol Translation" (NAT–PT), <draft–ietf–ngtrans–natpt–04.txt>, Jan. 1999, pp. 1 to 13.

Jeffrey Lo, K. Taniguchi, Internet Engineering Task Force, Internet Draft, "IP Host Network Address (and port) Translation," <draft–ietf–nat–hnat–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

(List continued on next page.)

Primary Examiner—Jack M. Choules
Assistant Examiner—Cheryl Lewis
(74) Attorney, Agent, or Firm—McDonnell Boehnen Hulbert & Berghoff

(57) ABSTRACT

A system and method for an Options Based Address Reuse ("OBAR") is provided. The system includes a first network having a host device with a host address and a host port, and a second network external to the first network and having a server device. The also comprises a combination network address for identifying the host device to the server device. The combination network address includes the host address, the host port, and an option. Similarly, the method involves sending a packet from the host device to the server device through a router, and adding the option to the packet.

30 Claims, 8 Drawing Sheets

OTHER PUBLICATIONS

P. Srisuresh, G. Tsirtsis, P. Akkiraju, A. Heffernan, Internet Engineering Task Force, Internet Draft, "DNS Extensions to Network Address Translators" (DNS_ALG), <draft–ietf–nat–dns–alg–01.txt>, Oct. 1998, pp. 1 to 24.

P. Srisuresh, Internet Engineering Task Force, Internet Draft "Security for IP Network Address Translator (NAT) Domains," <draft–ietf–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R. G. Moskowitz, Internet Engineering Task Force, Internet Draft, "Network Address Translation Issues with IPsec," <draft–moskowitz–net66–vpn–00.txt>, Feb. 6, 1998, p. 1 to 8.

R. Thay, N. Doraswa and R. Gle, Internet Engineering Task Force, Internet Draft "IP Security," <draft–ietf–ipsec–doc–roadmap–02.txt.>, Nov. 1997, pp. 1 to 12.

T. Hain, Internet Engineering Task Force, Internet Draft, "Architectural Implications of NAT," <draft–iab–nat–implications–02.txt>, Oct. 1998, pp. 1 to 14.

W.T. Teo, S.W. Yeow, R. Singh, Internet Engineering Task Force, Internet Draft, "IP Relocation Through Twice Network Address Translators, <draft–ietf–nat–rnat–00.txt>," Feb. 1999, pp. 1 to 20.

W.T. Teo, S.W. Yeow, R. Singh, Internet Engineering Task Force, Internet Draft, "Reverse Twice Network Address Translators" (RAT), <draft–teoyeow–mip–rat–01.txt>, Dec. 1998, pp. 1 to 20.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

K. Egevang, and P. Francis, Internet Engineering Task Force, ("IETF"), Request for Comments ("RFC") RFC–1631, "The IP Network Address Translator (NAT)", May 1994, pp. 1–10.

Borella, Michael, *Technology Update—Protocol Helps Stretch IPv4 Addresses*, "Network World", vol. 17, No. 3, Jan. 17, 2000, p. 43.

* cited by examiner

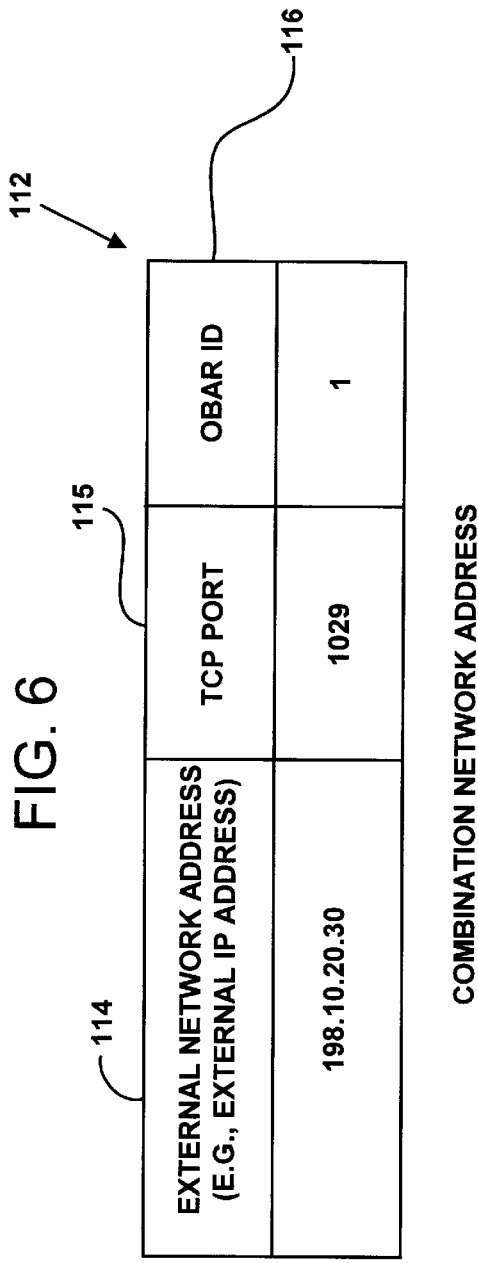
FIG. 6  COMBINATION NETWORK ADDRESS
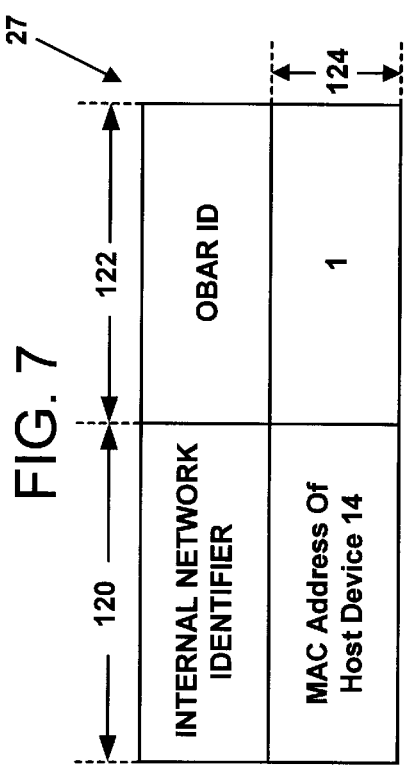
FIG. 7  OBAR ID-TO-INTERNAL NETWORK IDENTIFIER TABLE

SYSTEM AND METHOD FOR OPTIONS BASED ADDRESS REUSE

FIELD OF INVENTION

This invention relates to computer networks. More specifically, it relates to a system and method for an Options Based Address Reuse ("OBAR") for computer networks.

BACKGROUND OF THE INVENTION

Internet Protocol ("IP") is an addressing protocol designed to route traffic within a network or between networks. Current versions of IP, such as IP version 4 ("IPv4"), are becoming obsolete because of limited address space. With a 32-bit address-field, it is possible to assign $2^{32}$ different addresses, which is U.S. Pat. No. 4,294,967,296, or greater than 4 billion possible addresses. A unique IP number is typically assigned to network devices and a network using IP, whether or not the network is connected to the Internet. Most organizations, such as corporations and universities have multiple networks using IP, with multiple network devices each assigned an IP address. With the explosive growth of the Internet and intranets, IP addresses using a 32-bit address-field may soon be exhausted. IP version 6 ("IPv6") proposes the use of a 128-bit address-field for IP addresses. However, a large number of legacy networks, including a large number of Internet nodes, will still be using older versions for IP with a 32-bit address space for many years to come. For more information on IP, see Internet Engineering Task Force ("IETF") Request For Comments ("RFC") RFC-791, specifically incorporated herein by reference.

Transmission Control Protocol ("TCP") is a connection-oriented, end-to-end reliable protocol designed to fit into a layered hierarchy of protocols which support multi-network applications. For more information on TCP, see RFC-793, specifically incorporated herein by reference. Transmission Control Protocol/Internet Protocol ("TCP/IP") is a common and well-known networking protocol comprised of TCP and IP that provides communication across interconnected networks, between computers with diverse hardware architectures and various operating systems. TCP/IP requires each network device to have its own globally routable, globally unique IP address, and each TCP/IP connection or socket is unique for, and characterized by, a quadruple of source-address/source-port/destination-address/destination-port.

Typical TCP/IP Session

FIG. 1 illustrates a typical TCP/IP session between a Host 1 and a Server 1 over the Internet and through Router A and Router B. As is known in the art, a router translates differences between network protocols and routes data packets to an appropriate network node or network device. While only traffic between Host 1 and Server 1 is shown in FIG. 1 for ease of illustration, it should be understood that there may be multiple Hosts and Servers connected to Router A and Router B, respectively. In setting up the session, Host 1 and Server 1 each have their own globally routable, globally unique IP address, and TCP port. For the example shown in FIG. 1, Host 1 has a globally routable and unique IP address of "Host 1" and a TCP port of 1029, and Server 1 has a globally routable and unique IP address of "Server 1" and a TCP port of 80.

Although Router A and Router B also have at least one of their own globally routable and unique IP addresses, they need not be mentioned for purposes of this example, since Router A and Router B simply act as forwarding agents during the session. In other words, each packet that arrives at either Router A or Router B is simply forwarded out the appropriate interface, depending on the destination IP address indicated in the packet. Because packets from the Internet are forwarded to the network devices (i.e., Host 1 and Server 1) by their respective routers (i.e., Router A and Router B) based on a destination IP address, however, it is critical that each of the network devices have a globally routable, globally unique IP address. Otherwise, the routers would not know to which network device to send the packets.

FIG. 1 illustrates the typical steps involved with setting up, conducting, and terminating the TCP/IP session. Host 1 creates a TCP/IP socket in computer memory for the connection between itself and Server 1. This socket holds state information for the TCP/IP connection, such as sequence number, acknowledgement number, and round-trip calculation (see, e.g., W. R. Stevens, *TCP/IP Illustrated, Vol. 1*, Addison-Wesley, 1994). The unique quadruple characterizing the TCP/IP socket created by Host 1 is Host 1/1029/Server 1/80. Host 1 sends a TCP-SYN packet to Server 1 to begin TCP transmission. The IP header of the TCP-SYN packet, as well as any other data packet sent by Host 1 to Server 1, contains a source address of Host 1, a source port of 1029, a destination address of Server 1, and a destination port of 80.

Assuming a listen socket exists on the TCP port for which the TCP request refers, Server 1 creates a TCP/IP socket for the connection between itself and Host 1. This socket holds information similar to that held by the TCP/IP socket at Host 1. In addition, the unique quadruple characterizing the TCP/IP socket created by Server 1 is Server 1/80/Host 1/1029.

Server 1 then sends a TCP-SYN-ACK packet to Host 1 to acknowledge the TCP transmission. The IP header of the TCP-SYN-ACK packet, as well as any other data packet sent by Server 1 to Host 1, contains a source address of Server 1, a source port of 80, a destination address of Host 1, and a destination port of 1029. Host 1 responds with a TCP-ACK packet to acknowledge the acknowledgement sent by Server 1, and data is exchanged between Server 1 and Host 1. Assuming the host closes the TCP/IP session first, Host 1 sends a TCP-FIN packet to Server 1 to initiate termination of the TCP/IP session. Finally, the session ends when Server 1 sends a TCP-FIN-ACK packet to Host 1 to acknowledge receipt of the termination request.

Network Address Translation

Network address translation ("NAT") has been proposed to extend the lifetime of IPv4 and earlier versions of IP by allowing a small home office or small network to exist behind one or more IP addresses. The one or more IP addresses are used for communication with external networks such as the Internet. Internally, the small home office or small network uses private addressing. When a device or node using private addressing desires to communicate with the external world, a private address is translated to a common IP address used for communication with an external network by a NAT-enabled device, such as a NAT router.

There are several problems associated with using NAT to extend the life of IP. NAT interferes with the end-to-end routing principal of the Internet which recommends that packets flow end-to-end between network devices without changing the contents of any packet along a transmission route (see e.g., C. Huitema, *Routing in the Internet,* Prentice Hall, 1995). Current versions of NAT replace a private network address in a data packet header with an external network address on outbound traffic, and replace an external address in a data packet header with a private network address on inbound traffic. In addition, NAT typically replaces an internal network device's port number in a data packet header with a corresponding external port number on outbound traffic, and replaces an external port number in a data packet header with a corresponding internal network device's port number on inbound traffic. This type of address and port translation is computationally expensive, causes security problems by preventing certain types of encryption from being used, or breaks a number of existing applications in a network that cannot do NAT (e.g., File Transfer Protocol ("FTP")).

Current versions of NAT may not gracefully scale beyond a small network containing a few dozen nodes or devices because of the computational and other resources required. NAT potentially requires support for many different internal network protocols to be specifically programmed into a translation mechanism for external protocols in a NAT device, such as a NAT router. Computational burdens placed on a NAT router may be significant and degrade network performance, especially if several NAT-enabled stub networks share the same NAT router. In a worst case scenario, a NAT router translates every inbound and outbound data packet.

Furthermore, when NAT is used to translate a TCP/IP data packet, the packet's IP and TCP checksums are recalculated. When a port in a TCP header is translated, the packet's TCP checksum are also recalculated. This further increases the computational cost of translation in a NAT router. In addition, when an IP address or port is translated with NAT, a new length may result for the data packet and a possible change in a TCP sequence number. A running sequence number offset (i.e., a delta) must then be maintained throughout the remainder of the connection. This delta must be applied to future traffic, including acknowledgment numbers, which further increases computational time in a NAT router. Moreover, a NAT router must not only be able to translate addresses and ports, but also change lengths and maintain sequence numbers for a number of different protocols that may transmit an IP address or port number (e.g., FTP, H.323, H.324, CUSeeME, RealAudio, Internet Relay Chat and others).

Typical TCP/IP Session Using NAT

FIG. 2 illustrates a typical TCP/IP session using NAT between a Host 1 and a Server 1 over the Internet and through a NAT-enabled Router A and a Router B. While only traffic between Host 1 and Server 1 is shown in FIG. 2 for ease of illustration, it should be understood that there may be multiple Hosts and Servers connected to Router A and Router B, respectively. In setting up the session, only Server 1, Router A, and Router B each have at least one of their own globally routable, globally unique IP addresses, while Host 1 has a globally unroutable, network unique IP address. Host 1, Server 1 and Router A each have at least one of their own TCP ports, however. For the example shown in FIG. 2, Host 1 has an IP address of "Host 1" and a TCP port of 1029, Server 1 has an IP address of "Server 1" and a TCP port of 80, and Router A has an IP address of "Router A" and a chosen TCP port of 9000.

Although Router B also has at least one unique IP address of its own, it need not be mentioned for purposes of this example, since Router B is not NAT-enabled and simply acts as a forwarding agent during the session. In other words, each packet that arrives at Router B is simply forwarded out the appropriate interface, depending on the destination IP address indicated in the packet.

FIG. 2 illustrates the typical steps involved with setting up, conducting, and terminating the TCP/IP session using NAT. Host 1 creates a TCP/IP socket in computer memory for the connection between itself and Server 1. This socket holds state information for the TCP/IP connection, such as sequence number, acknowledgement number, round-trip calculation (see, e.g., W. R. Stevens, *TCP/IP Illustrated, Vol. 1*, Addison-Wesley, 1994). The unique quadruple characterizing the TCP/IP socket created by Host 1 is Host 1/1029/Server 1/80. Host 1 then sends a TCP-SYN packet to Server 1 to begin TCP transmission. The IP header of the TCP-SYN packet, as well as any other data packet sent by Host 1 to Server 1, contains a source address of Host 1, a source port of 1029, a destination address of Server 1, and a destination port of 80.

Router A intercepts the TCP-SYN packet. Noticing the packet came in on the interface connected to the NAT network, Router A records the source IP address of the packet, which is the IP address of "Host 1" in this example, and the TCP source port number of the packet, which is 1029 in this example. A free subnet unique TCP port number is then chosen from Router A's port-mapping table. Router A changes the source IP address of the packet to equal the IP address of Router A itself, which is "Router A" for purposes of this example. The TCP source port number of the packet is also changed to equal the free TCP port number chosen from the port-mapping table, which is 9000 in this example. An entry is made in the port-mapping table, mapping the free TCP port number (i.e., 9000) chosen by Router A to the original IP address of the packet, which is the IP address of "Host 1" in this example, and the original TCP port number of the packet, which is 1029 in this example. Router A then forwards the modified packet to Server 1. Throughout this entire process, Router A does not create a separate TCP/IP socket.

Server 1 creates a TCP/IP socket for the connection between itself and Host 1. This socket holds information similar to that held by the TCP/IP socket at the host. The TCP/IP socket created by Server 1, however, reflects that the connection is between itself and Router A, even though the actual connection is between itself and Host 1. This discrepancy exists because the TCP-SYN packet received by Server 1 contains the IP address of "Router A" as the source IP address instead of the IP address of "Host 1." As a result, the unique quadruple characterizing the TCP/IP socket created by Server 1 is Server 1/80/Router A/9000. Server 1 then sends a TCP-SYN-ACK packet to Router A to acknowledge the TCP transmission, since the socket at Server 1 indicates the IP address of "Router A" as the IP address of the other end of the TCP/IP connection. The IP header of the TCP-SYN-ACK packet, as well as any other data packet sent by Server 1 to Router A, contains a source address of Server 1, a source port of 80, a destination address of router A, and a destination port of 9000.

Next, Router A receives the TCP-SYN-ACK packet, and finds an entry in the port-mapping table mapping the TCP destination port number of Router A (i.e., 9000) to the IP address of "Host 1" and the TCP destination port number of 1029. The destination IP address is set to "Host 1" and the TCP destination port to 1029, and the packet is forwarded on by Router A to Host 1. Host 1 responds with a TCP-ACK packet to acknowledge the acknowledgement sent by Server 1. The remainder of the TCP session continues in a similar manner as the previously described TCP/IP session without address reuse technology. Router A continues to replace the source IP address and TCP source port number of all outbound packets, however, and also continues to replace the destination IP address and TCP destination port number of all inbound packets, as described above.

Distributed Network Address Translation

One proposed solution to the problems associated with NAT is disclosed in U.S. patent application Ser. No. 09/035,600, entitled "Method And Protocol For Distributed Network Address Translation," filed on Mar. 5, 1998, commonly assigned with the present invention, and specifically incorporated herein by reference. The disclosed method and protocol for Distributed Network Address Translation ("DNAT") is used to overcome the limited address space of current versions of IP, particularly with small office or home office networks, or other legacy local networks, that have multiple network devices using a common external network address to communicate with an external network. DNAT uses a port allocation protocol to allocate globally unique ports to network devices on a local computer network, which are in turn used in a combination network address with a common external network address, such as an IP address, to identify multiple network devices on a local network to an external network, such as the Internet, an intranet, or a public switched telephone network.

While DNAT overcomes the large computational burdens encountered when NAT is used by a router for multiple network devices on a local network using a common external network address, and simplifies routers since a router in a DNAT system does not have to support multiple individual protocols, DNAT requires modifications to the operating system of the multiple network devices on the local network. Most end users of these network devices (i.e., the hosts), however, are inexperienced with making such modifications and performing the necessary advanced network maintenance, such as operating system upgrades, especially when compared to the network administrators operating the external networks (i.e., the servers). Consequently, from at least a commercial standpoint, DNAT may be difficult to implement.

Accordingly, it is desirable to provide a system and method for IP address reuse that extends the lifetime of IPv4 and earlier versions of IP, yet overcomes the disadvantages associated with NAT and DNAT. In particular, it would be desirable to provide a system and method for IP address reuse that avoids the computational, scalability, and compatibility problems of NAT, while requiring modifications only at the server end, rather than at the host end as required by DNAT.

SUMMARY OF THE INVENTION

In accordance with an illustrative embodiment of the present invention, the disadvantages associated with NAT and DNAT are overcome. A system and method for an Options Based Address Reuse ("OBAR") is provided. The system of the present invention comprises a first network having a host device with a host address and a host port, and a second network external to the first network and having a server device. The system of the present invention also comprises a combination network address for identifying the host device to the server device. The combination network address includes the host address, the host port, and an option.

The method of the present invention comprising the step of providing a first network having a router and a host device, with the host device having a host address, a host port, and an internal network identifier. The method of the present invention also comprises the step of providing a second network external to the first network and having a server device with a server address and a server port. In addition, the method of the present invention comprises the steps of sending a packet from the host device to the server device through the router, and adding an option to the packet.

BRIEF DESCRIPTION OF THE DRAWINGS

FIG. 6 is a block diagram illustrating a combined network address layout.

FIG. 7 is a block diagram illustrating an OBAR ID-to-internal network identifier table layout.

DETAILED DESCRIPTION OF AN ILLUSTRATIVE EMBODIMENT

Figure 3:
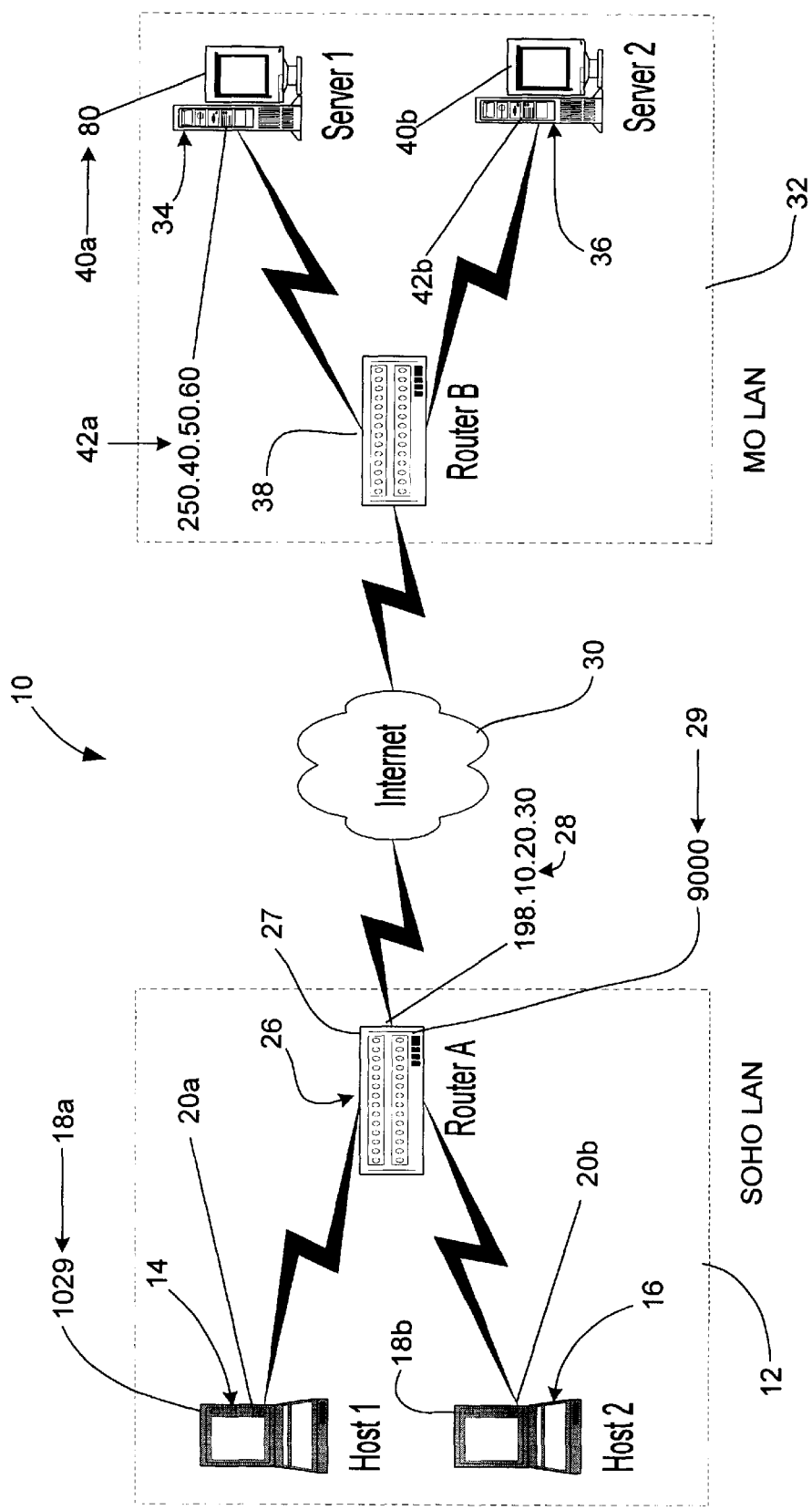
FIG. 3 is a block diagram illustrating a network system of the present invention.

FIG. 3 is a block diagram illustrating a network system 10 for an illustrative embodiment of the present invention. The IP address reuse technology of the present invention that is used by the network system 10 is called an Options Based Address Reuse, referred to hereinafter as "OBAR." The network system 10 comprises a first computer network 12, a second computer network 30, and a third computer network 32. In one embodiment of the present invention, the first network 12 is a Small Office/Home Office ("SOHO") Local Area Network ("LAN"), also called a "legacy" LAN, the second computer network 30 is the Internet, and the third computer network 32 is a Main Office ("MO") LAN. However, other network types and network components can also be used, and the present invention is not limited to the network types and network components described for an illustrative embodiment.

The first computer network 12 has multiple host devices 14, 16 connected to a router 26, which routes data packets from/to the host devices to/from other external computer networks, such as the second and third computer networks 30, 32. Although only computers are depicted in the first network 12 shown in FIG. 3, it should be understood that the multiple host devices may be any type of network device including printers, facsimile devices, hand-held devices, telephones or other network devices. The first computer network 12 also has an external common network address 28 (e.g., an IP address of 198.10.20.30) to identify the first network 12 to external computer networks, such as the second and third computer networks 30, 32. Preferably, the external common network address 28 is a globally routable, globally unique IP address.

The multiple host devices 14, 16 each have at least one source port 18a (e.g., 1029), 18b, respectively, an IP address equivalent to the external common network address 28, and an internal network address 20a, 20b, respectively, for identifying the host devices within the first computer network 12 (e.g., a Media Access Control ("MAC") address or a modem port number). Similarly, the router 26 has at least one source port 29 (e.g., 9000) and an IP address equivalent to the external common network address 28. Preferably, the router 26 is OBAR-enabled and has a mapping table 27, as described in more detail below.

Data packets are sent from/to the first computer network 12 to/from the third computer network 32 through the second computer network 30 (i.e., the Internet). The third computer network 32 has multiple server devices 34, 36 connected to a router 38, which routes data packets from/to the server devices to/from other external computer networks, such as the first and second computer networks 12, 30. The multiple server devices 34, 36 each have at least one source port 40*a* (e.g., 80), 40*b*, respectively, and an external individual network address 42*a* (e.g., 250.40.50.60), 42*b* that is preferably a globally routable, globally unique IP address. In addition, the server devices 34, 36 are preferably OBAR-enabled, as described in more detail below.

Although not shown in FIG. 3, the router 38 also preferably has at least one globally routable, globally unique IP address of its own. Preferably, the router 38 is not OBAR-enabled, however, and simply acts as a forwarding agent during communication sessions involving the third computer network 32. In other words, each packet that arrives at the router 38 is simply forwarded out the appropriate interface, depending on the destination IP address indicated in the packet.

A preferred method of using the system of the present invention will now be described with reference to FIGS. 4–7. While only traffic between the host device 14 of the first computer network 12 and the server device 34 of the third computer network 32 is shown in the communication session of FIG. 4 for ease of illustration, it should be understood that there may be multiple host and server devices connected to the routers 26, 38, respectively. As previously mentioned, the host device 14 has an IP address of 198.10.20.30 and a TCP port number of 1029, and the server device 34 has an IP address of 250.40.50.60 and a TCP port number of 80. Similarly, the IP address of the router 26 is the same as the host device 14, namely 198.10.20.30.

In setting up the session, the host device 14 creates a TCP/IP socket 50 in computer memory for the connection between itself and the server device 34. This socket 50 holds state information for the TCP/IP connection, such as sequence number, acknowledgement number, and round-trip calculation (see, e.g., W. R. Stevens, *TCP/IP Illustrated, Vol. 1*, Addison-Wesley, 1994). In addition, the unique quadruple characterizing the TCP/IP socket 50 created by the host device 14 is as follows: 198.10.20.30 (source address)/1029 (source port)/250.40.50.60 (destination address)/80 (destination port).

The host device 14 then sends a TCP-SYN packet 101*a* to the server device 34 to begin TCP transmission. The IP header of the TCP-SYN packet 101*a* contains the source address of 198.10.20.30, the source port of 1029, the destination address of 250.40.50.60, and the destination port of 80. IP headers are well known in the art.

Figure 4:
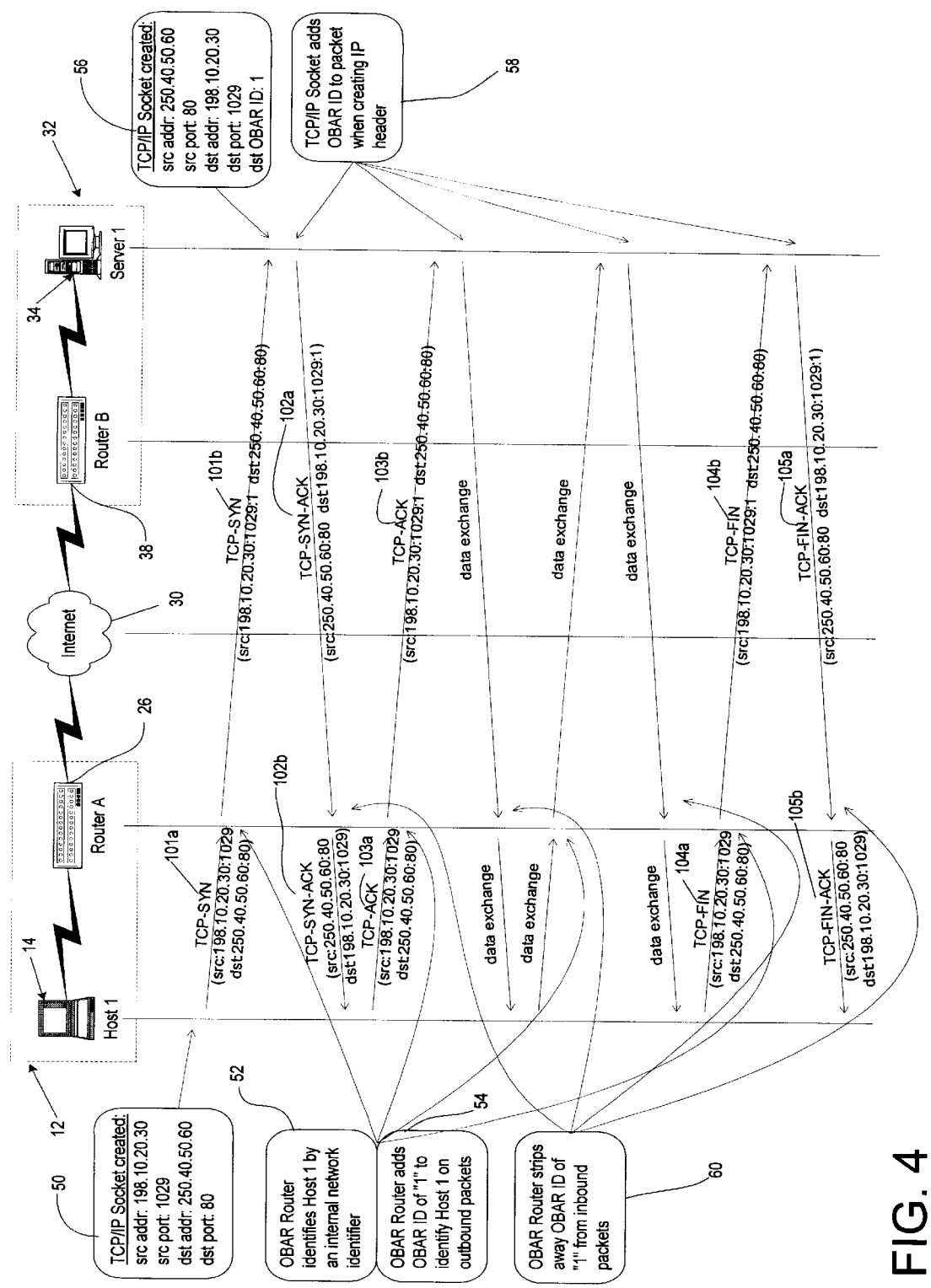
FIG. 4 is a block diagram illustrating a communication session of the network system of FIG. 3.

The router 26 intercepts this TCP-SYN packet 101*a*, however, before it leaves the first computer network 12. The router 26 first identifies the host device 14 that sent the packet, as represented in FIG. 4 by reference numeral 52. Preferably, but not necessarily, the router 26 identifies the host device 14 by an internal network identifier, such as the MAC address of the host device 14, or alternatively by a modem port number if the host device 14 is connected to the first computer network 12 and the router 26 via a modem. It should be understood that other internal network identifiers may be used to identify the particular host device that sent the TCP-SYN packet 101*a*.

Figure 5:
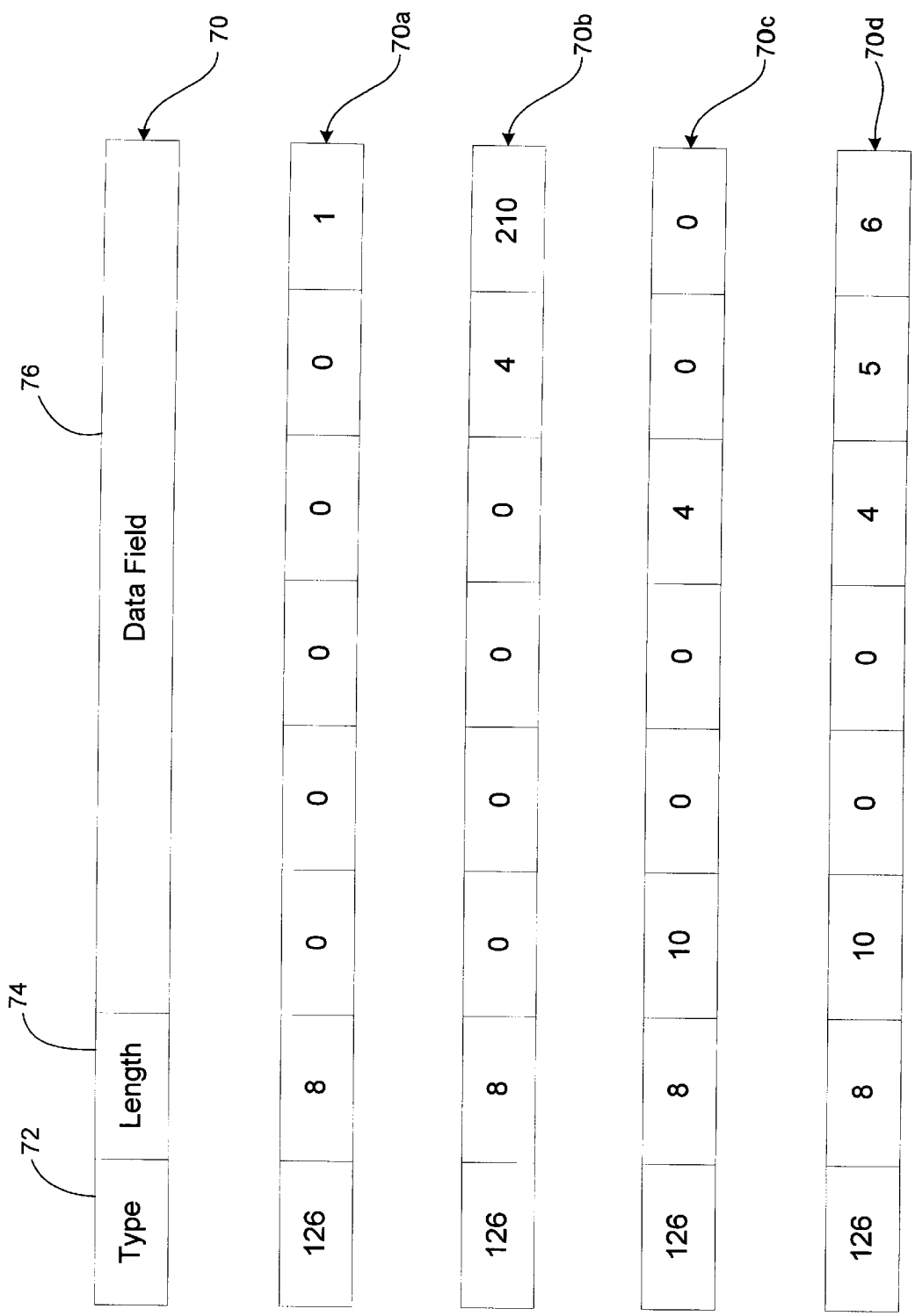
FIG. 5 is a block diagram illustrating examples of OBAR ID formats.

Next, the router 26 adds an OBAR ID to the IP options part of the IP header of the TCP-SYN packet 101*a* sent by the host device 14, as represented in FIG. 4 by the reference numeral 54. IP options of IP headers are well known in the art. The OBAR ID used in FIG. 4 for illustration purposes is "1." Any number of different options and formats may be used, however, for the OBAR ID. As shown in FIG. 5, the OBAR ID preferably has a format 70, with a type field 72, a length field 74, and a data field 76 for identifying a specific host device. In one illustrative embodiment, the OBAR ID has a type of 126 and a length of 8 bytes, thereby leaving 6 bytes for the data field 76. The remaining 6-byte long data field 76 may be an integer, such as "1," or an internal and unroutable IP address. FIG. 5 shows an OBAR ID format 70*a* for the number 1, an OBAR ID format 70*b* for the number 1234, an OBAR ID format 70*c* for the address 10.0.0.4, and an OBAR ID format 70*d* for the address 10.0.0.4.5.6. Zeros are used to pad the data field bytes not used, and the 4 and 210 used in the format 70*b* are simply the decimal representations of the 8-bit binary bytes that make up the number 1234. For purposes of the present application, the OBAR ID may be referred to simply by its data field 76 (i.e., an OBAR ID of "1").

The TCP/IP stack of the router 26 may be modified by a network administrator in charge of configuring and operating the router 26 of the first computer network 12, so that OBAR IDs may be statically set for each host device connected to the router 26. Alternatively, a separate protocol for the router 26 may be designed to create OBAR IDs and assign them to the internal network identifiers of the host devices. Preferably, an appropriate extension of Dynamic Host Configuration Protocol ("DHCP") is used by the router 26 to create and assign the OBAR IDs for the connected host devices. DHCP is a protocol for passing configuration information such as IP addresses to host devices on an IP computer network. DHCP and its extensions are well know in the art. For more information on DHCP see RFC-1541, specifically incorporated herein by reference. The format of DHCP messages is based on the format of BOOTstrap Protocol ("BOOTP") messages described in RFC-951 and RFC-1542, specifically incorporated herein by reference. From a network device's point of view, DHCP is an extension of BOOTP.

As a result of the OBAR ID attached by the router 26, the host device 14 now has a combination external network address 112, as shown in FIG. 6. The combination external network address 112 is used to identify the host device 14 to other networks or devices external to the first computer network 12. The combination external network address 112 comprises an external IP address 114, a TCP port number 115, and an OBAR ID 116. For the example shown in FIG. 4, the external IP address 114 is the same as the external common network address 28, which is 198.10.20.30, the TCP port number 115 is 1029, and the OBAR ID 116 is 1.

As shown in FIG. 7, the router 26 records the internal network identifier for the host device 14 (i.e., the MAC address of the host device 14) in an internal network identifier column 120 of the mapping table 27, and records the corresponding OBAR ID (i.e., "1") in an OBAR ID column 122 of the mapping table 27. Each entry in the internal network identifier column 120 and the OBAR ID column 122 represents a row 124 of the mapping table, with each row representing a host device connected to the router 26. Although only one row is shown, the mapping table 27 may have a plurality of rows, one for each of the host devices connected to the router 26.

When the router 26 receives a data packet containing an OBAR ID, it looks up the OBAR ID (i.e., on column 122) on its mapping table to locate the corresponding internal network identifier (i.e., on column 120) in the same row of the mapping table, and passes the data packet along to the identified host device. For the example shown in FIG. 4, each time the router 26 receives a data packet containing the OBAR ID of "1," the router 26 looks up the OBAR ID of "1" in the column 122 of the mapping table 27, finds the corresponding MAC address of the host device 14 in the column 120 of the mapping table 27, which is located in the same row 124 as the OBAR ID, and forwards the data packet to the host device 14.

After adding the OBAR ID to the TCP-SYN packet 101*a*, the router 26 then proceeds to forward a TCP-SYN packet 101*b* to the server device 34. The TCP-SYN packet 101*b* is identical to the TCP-SYN packet 101*a*, except that the TCP-SYN packet 101*b* also contains the OBAR ID. Assuming a listen socket exists on the TCP port for which the TCP request refers, the server device 34 creates a TCP/IP socket 56 for the connection between itself and the host device 14. This socket holds information similar to that held by the TCP/IP socket at the host device 14.

The server device 34 is preferably OBAR-enabled, however, and therefore has a slightly modified TCP/IP stack. In particular, the unique quadruple of source-address/source-port/destination-address/destination-port that normally characterizes TCP/IP sockets created by the server device 34 is replaced with a modified unique tuple of source-address/source-port/destination-address/destination-port/OBAR ID. For the example illustrated in FIG. 4, this modified tuple for the TCP/IP socket 56 is 250.40.50.60 (source address)/80 (source port)/198.10.20.30 (destination address)/1029 (destination port)/1 (OBAR ID). In addition, or alternatively, the TCP/IP stack for the OBAR-enabled server device 34 is modified to look for and record any OBAR IDs present in the IP options of the IP headers of incoming data packets. Regardless of what modifications are made to the TCP/IP stack of the server device 34, all data packets that are sent from the OBAR-enabled server device 34, and through the TCP/IP socket 56 created for the host device 14, will have the appropriate OBAR ID (i.e., "1") appended to the end of the IP options present in the IP header of the data packets, as represented in FIG. 4 by the reference numeral 58. As a result, even if multiple host devices with the same IP address and TCP port are exchanging data packets with the server device 34, each connection with a host device is kept unique by the server device 34 based on the host device's OBAR ID.

The server device 34 next sends a TCP-SYN-ACK packet 102*a* to the host device 14 to acknowledge the TCP transmission. The IP header of this TCP-SYN-ACK packet 102*a* contains the source address of 250.40.50.60, the source port of 80, the destination address of 198.10.20.30, the destination port of 1029, and the OBAR ID of 1. The router 26 receives the TCP-SYN-ACK packet 102*a* from the server device 34 and notices that an OBAR ID is present. As previously explained, the router 26 uses its mapping table 27 to identify that the host device 14 is the true recipient of packets containing the OBAR ID of 1. Accordingly, the router 26 removes the OBAR ID from the TCP-SYN-ACK packet 102*a*, as represented in FIG. 4 by reference numeral 60, and forwards a TCP-SYN-ACK packet 102*b* to the host device 14. The TCP-SYN-ACK packet 102*b* is identical to the TCP-SYN-ACK packet 102*a*, except that the OBAR ID has been removed from the TCP-SYN-ACK packet 102*b* by the router 26.

The host device 14 then responds with a TCP-ACK packet 103*a* to acknowledge the TCP-SYN-ACK packet sent by the server device 34. Like the TCP-SYN packet 101*a*, the IP header of the TCP-ACK packet 103*a* contains the source address of 198.10.20.30, the source port of 1029, the destination address of 250.40.50.60, and the destination port of 80. Once again, this TCP-ACK packet 103*a* is intercepted by the router 26, which adds the OBAR ID of 1 to the TCP-ACK packet 103*a* to create a TCP-ACK packet 103*b*. The TCP-ACK packet 103*b* is then forwarded by the router 26 to the server device 34, and data is exchanged between the server device 34 and the host device 14 in a manner similar to the exchange of the TCP-SYN, TCP-SYN-ACK, and TCP-ACK packets. In this data exchange, the IP header of each data packet that is sent by the server device 34 contains the OBAR ID of 1, similar to the TCP-SYN-ACK packet 102*a*. Also during this data exchange, the router 26 continues to add the OBAR ID of 1 to the IP headers of each data packet sent by the host device 14 to the server device 34, as with the TCP-SYN and TCP-ACK packets, and continues to remove the OBAR ID of 1 from the IP headers of each data packet sent by the server device 34 to the host device 14, as with the TCP-SYN-ACK packet 102*b*.

After the data exchange is finished, and assuming the host device 14 closes the TCP/IP session first, the host device 14 sends a TCP-FIN packet 104*a* to the server device 34 to initiate termination of the TCP/IP session. Like the TCP-SYN packet 101*a* and the TCP-ACK packet 103*a*, the IP header of the TCP-FIN packet 104*a* contains the source address of 198.10.20.30, the source port of 1029, the destination address of 250.40.50.60, and the destination port of 80. Once again, this TCP-FIN packet 104*a* is intercepted by the router 26, which adds the OBAR ID of 1 to the TCP-FIN packet 104*a* to create a TCP-FIN packet 104*b*. The TCP-FIN packet 104*b* is identical to the TCP-FIN packet 104*a*, except that the IP header of the TCP-FIN packet 104*b* also contains the OBAR ID of 1.

The router 26 next forwards the TCP-FIN packet 104*b* to the server device 34. The server device 34 responds to the TCP-FIN packet by sending a TCP-FIN-ACK packet 105*a* to the host device 14 to acknowledge receipt of the termination request. The IP header of this TCP-FIN-ACK packet 105*a* contains the source address of 250.40.50.60, the source port of 80, the destination address of 198.10.20.30, the destination port of 1029, and the OBAR ID of 1. The router 26 receives the TCP-FIN-ACK packet 102*a* from the server device 34 and notices that an OBAR ID is present. As previously explained, the router 26 uses its mapping table 27 to identify that the host device 14 is the true recipient of packets containing the OBAR ID of 1. Accordingly, the router 26 removes the OBAR ID from the TCP-FIN-ACK packet 105*a*, and forwards a TCP-FIN-ACK packet 105*b* to the host device 14. The TCP-FIN-ACK packet 105*b* is identical to the TCP-FIN-ACK packet 105*a*, except that the OBAR ID has been removed from the TCP-FIN-ACK packet 105*b* by the router 26. The TCP/IP session preferably ends when the host device 14 receives the TCP-FIN-ACK packet from the server device 34.

Figure 8:
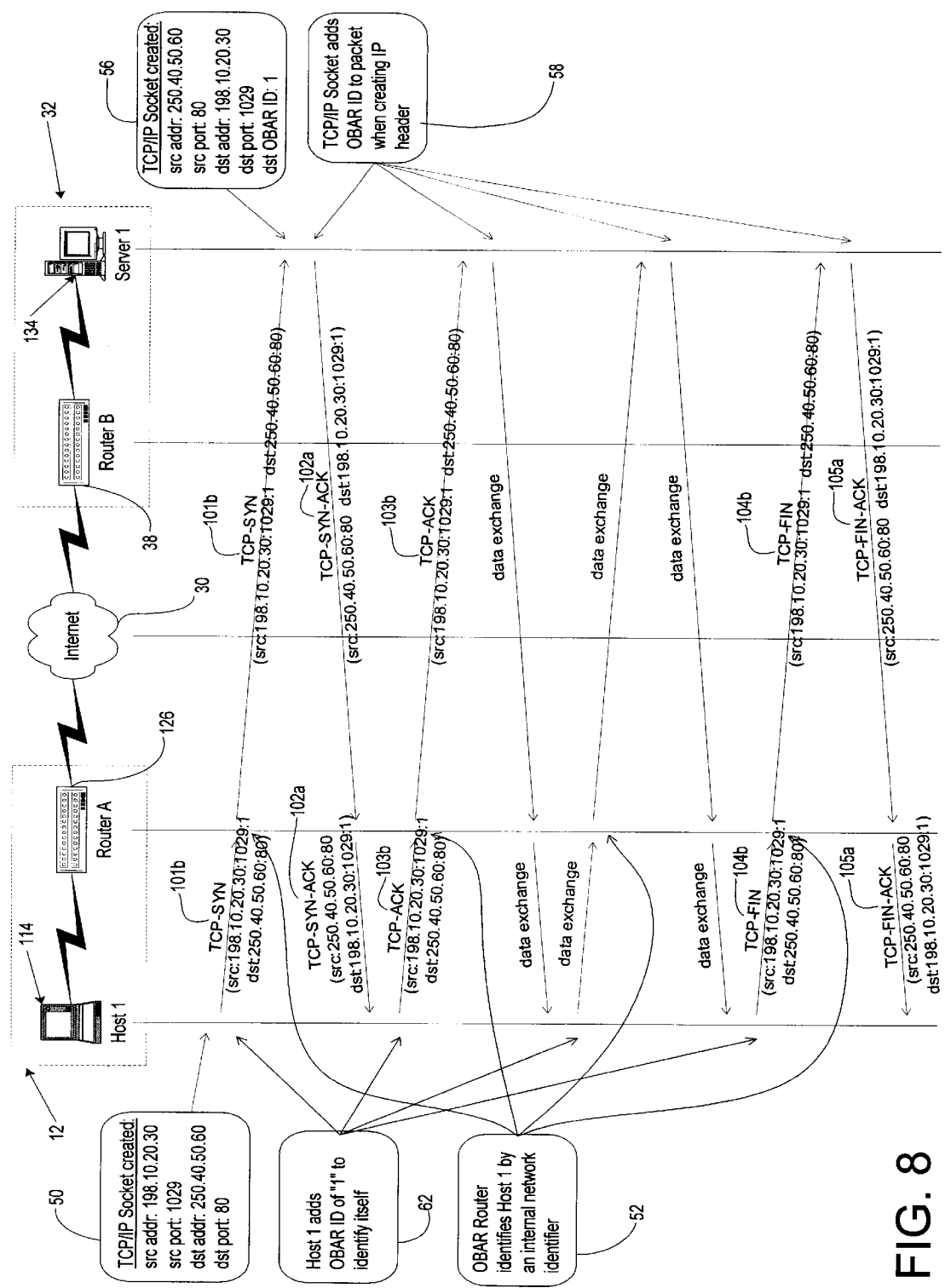
FIG. 8 is a block diagram illustrating a communication system of a network system with an OBAR-enabled host device, router, and server device.

FIG. 8 shows another embodiment of the present invention. The embodiment shown in FIG. 8 is identical to, and operates in the same manner as, the embodiment shown in FIGS. 3–7, with only a few exceptions. To avoid redundancy and unnecessary repetition, only the differences between the two embodiments will be discussed in detail below. For sake of clarity, the host device, its router, and the server device of the embodiment shown in FIG. 8 will be referenced by the numerals 114, 126, and 134, respectively. It should be understood that the host device 114, the router 126, and the server device 134 are identical to the host device 14, the router 26, and the server device 34, respectively, with the only differences being specifically noted below.

The primary difference between the two embodiments is that in the embodiment shown in FIG. 8, the host device 114 is OBAR-enabled. As a result, the host device 114 adds the OBAR ID (e.g., "1") to its outgoing data packets instead of the router 126, as represented in FIG. 8 by the reference numeral 62. Since the host device 114 is OBAR-enabled, the router 126 also no longer needs to remove the OBAR ID from data packets sent by the server device 134. In other words, steps 54 and 60 of the embodiment shown in FIGS. 3–7 are no longer necessary for the embodiment shown in FIG. 8. Consequently, the data packets sent from/to the host device 114 are identical to the data packets sent to/from the server device 134, regardless of which side of the router 126 the data packets are on (i.e., both TCP-SYN packets are identical to the TCP-SYN packet 101b, both the TCP-SYN-ACK packets are identical to the TCP-SYN-ACK packet 102a, both TCP-ACK packets are identical to the TCP-ACK packet 103b, both TCP-FIN packets are identical to the TCP-FIN packet 104b, and both TCP-FIN-ACK packets are identical to the TCP-FIN-ACK packet 105a).

Like the previous embodiment, the router 126 still needs to identify the host device that sent the packet, as represented in FIG. 8 by reference numeral 52, and map the internal network identifier (i.e., the MAC address of the host device) to the OBAR ID of the host device on the mapping table 27. As discussed in more detail above, these steps insure that the router 126 will know which host device should receive incoming data packets containing a particular OBAR ID.

Any of the OBAR IDs or formats mentioned in the previous embodiment shown in FIGS. 3–7 will work with the embodiment shown in FIG. 8. Similarly, the TCP/IP stack of the host device 114 may be modified by the user of the host device 114 to statically set the OBAR ID for the host device 114. Alternatively, a separate protocol may be designed to create and assign an OBAR ID to the host device 114. Similar to the previous embodiment, an appropriate extension of DHCP is preferably used by the router 126 to create and assign the OBAR IDs for the connected host devices, such as the host device 114. The only difference is that the extension of DHCP used by the router 126 would also distribute the OBAR IDs out to the appropriate host device, either automatically or in response to a request from the host device. For instance, the OBAR ID of 1 may automatically be distributed by the router 126 to the host device 114 when the host device 114 first connects to the router 126 (i.e., upon boot). Alternatively, the host device 114 may request and receive an OBAR ID from the router 126 when the host device 114 first connects to the router 126 (i.e., upon boot), or at another time after the connection between the router 126 and the host device 114 has been established.

Figure 9:
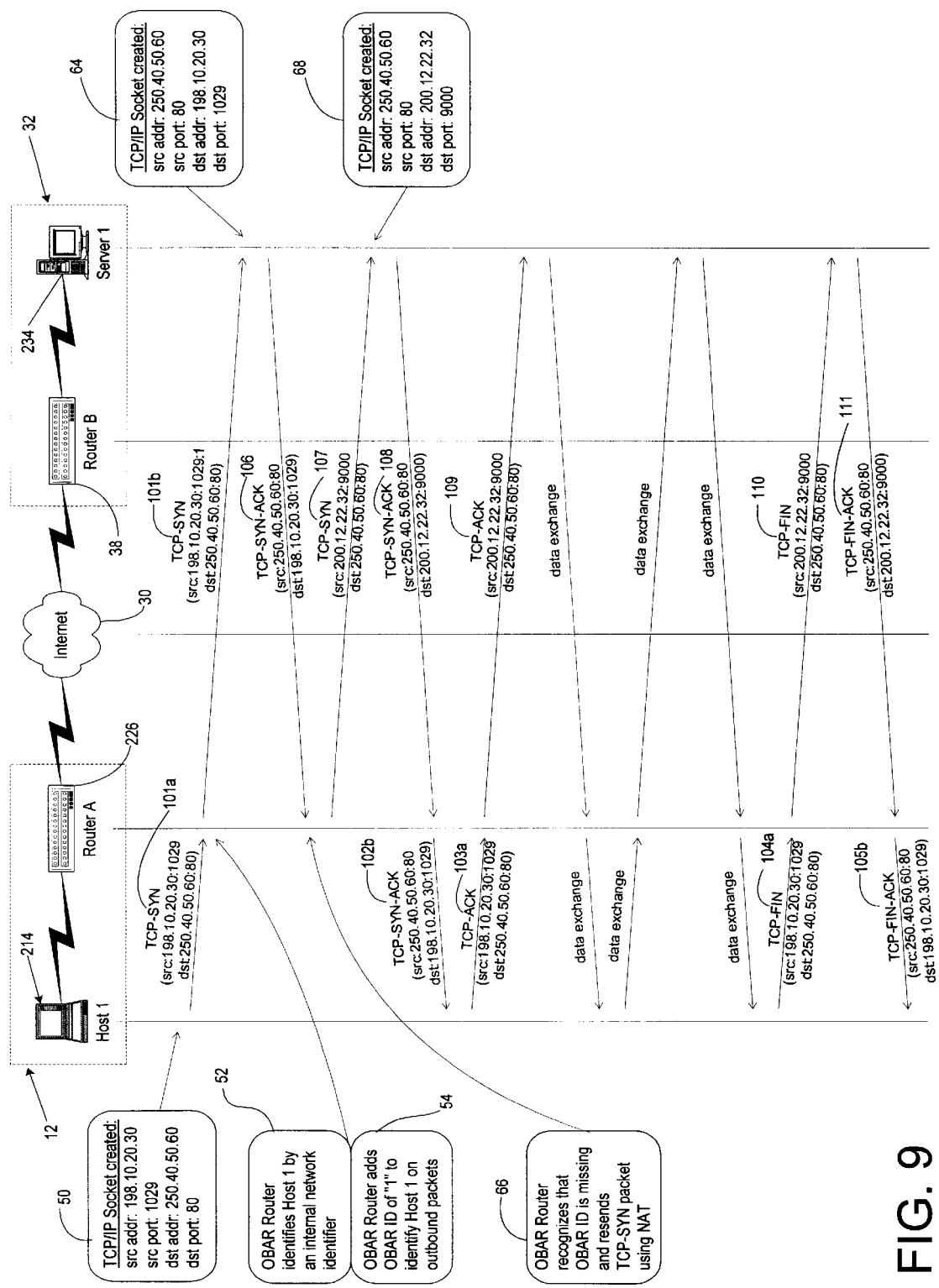
FIG. 9 is a block diagram illustrating a communication session of a network system without an OBAR-enabled host device or server device.

FIG. 9 shows another embodiment of the present invention. The embodiment shown in FIG. 9 is identical to, and operates in the same manner as, the embodiment shown in FIGS. 3–7, with only a few exceptions. To avoid redundancy and unnecessary repetition, only the differences between the two embodiments will be discussed in detail below. For sake of clarity, the host device, its router, and the server device of the embodiment shown in FIG. 9 will be referenced by the numerals 214, 226, and 234, respectively. It should be understood that the host device 214, the router 226, and the server device 234 are identical to the host device 14, the router 26, and the server device 34, respectively, with the only differences being specifically noted below.

The primary differences between the two embodiments are that in the embodiment shown in FIG. 9, the server device 234 is not OBAR-enabled and the router 226 is not only OBAR-enabled, but is also enabled with another address reuse technology, preferably NAT. In setting up the session, the host device 214 creates the TCP/IP socket 50 in computer memory for the connection between itself and the server device 234. The host device 214 then sends the TCP-SYN packet 101a to the server device 234 to begin TCP transmission. The router 226 intercepts the TCP-SYN packet 101a and identifies the host device 214 that sent the packet, as represented in FIG. 9 by reference numeral 52. The router 226 then adds the OBAR ID of 1 to the IP options part of the IP header of the TCP-SYN packet 101a sent by the host device 214, as represented in FIG. 9 by the reference numeral 54. The router 226 also records and maps the network identifier of the host device 214 (i.e., its MAC address) and the OBAR ID onto the mapping table 27, as described in detail above. The router 226 then proceeds to forward the TCP-SYN packet 101b to the server device 234. As stated above, the TCP-SYN packet 101b is identical to the TCP-SYN packet 101a except that the TCP-SYN packet 101b also contains the OBAR ID.

Assuming a listen socket exists on the TCP port for which the TCP request refers, the server device 234 creates a TCP/IP socket 64 for the connection between itself and the host device 214. This socket holds information similar to that held by the TCP/IP socket 50 at the host device 214. The server device 234 is not OBAR-enabled, however, in the embodiment shown in FIG. 9. Accordingly, OBAR IDs are not supported by the server device 234, and are therefore ignored by the TCP/IP stack of the server device 234. For more information on unsupported IP options in IP headers, see RFC 1122, specifically incorporated herein by reference. As a result, for the embodiment shown in FIG. 9, the unique quadruple of source-address/source-port/destination-address/destination-port that characterizes the TCP/IP socket 64 created by the server device 234 is 250.40.50.60 (source address)/80 (source port)/198.10.20.30 (destination address)/1029 (destination port).

Figure 1:
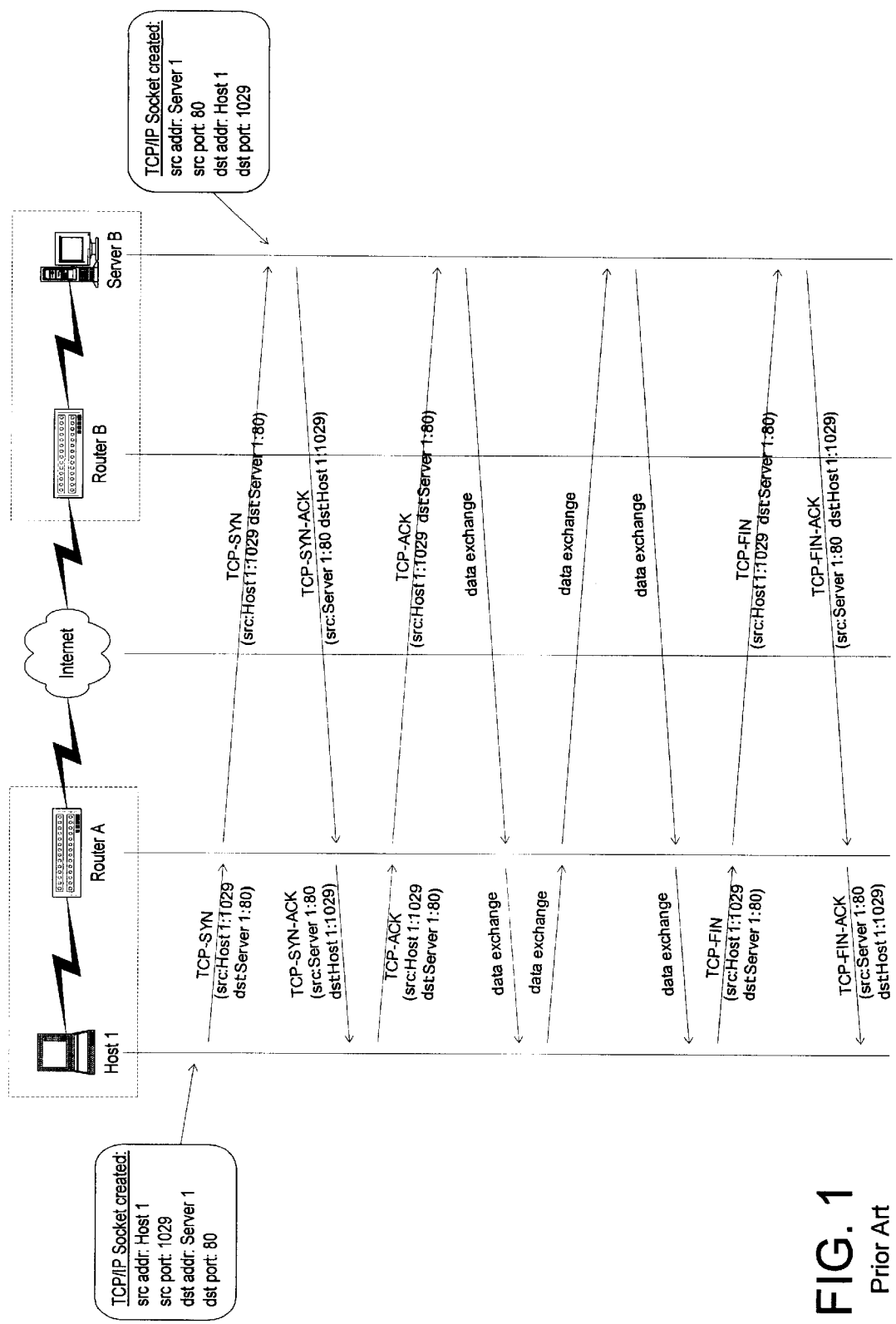
FIG. 1 is a block diagram illustrating a typical TCP/IP session without address reuse for a network system of the prior art.
Figure 2:
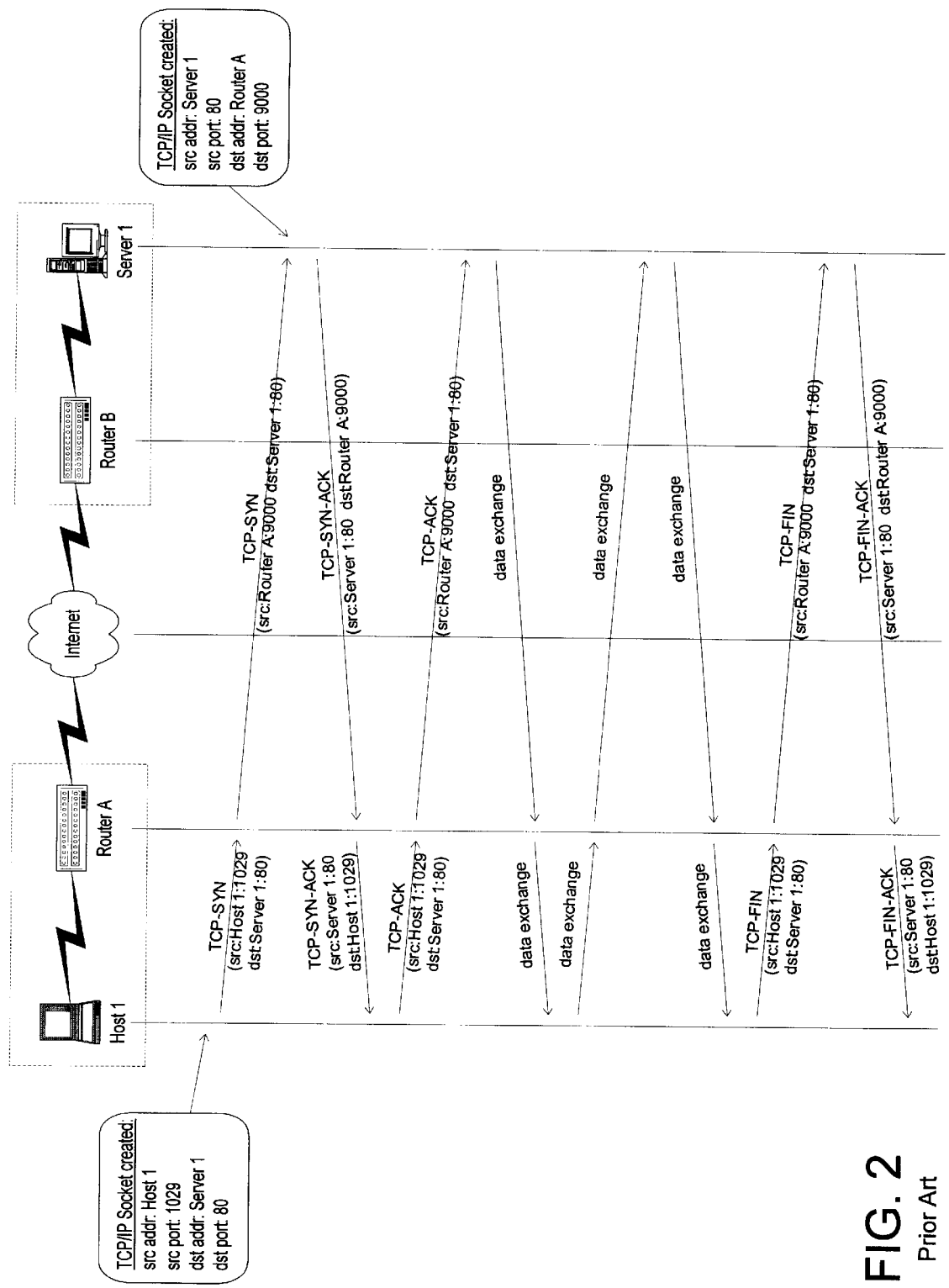
FIG. 2 is a block diagram illustrating a typical TCP/IP session using NAT for a network system of the prior art.

The server device 234 next sends a TCP-SYN-ACK packet 106 to the host device 214 to acknowledge the TCP transmission. The IP header of this TCP-SYN-ACK packet 106 contains the source address of 250.40.50.60, the source port of 80, the destination address of 198.10.20.30, and the destination port of 1029. As represented in FIG. 9 by the reference numeral 66, the router 226 receives the TCP-SYN-ACK packet 106 from the server device 234, notices that the OBAR ID is missing, and sends a new TCP-SYN packet 107 using another address reuse technology, preferably NAT. It is contemplated that other address reuse technologies may be implemented by the router 226 instead of NAT. Furthermore, since NAT was previously explained and shown in FIG. 2, and is well-known in the art, the details of NAT will not be repeated herein.

NAT requires the router 226 to have a different IP address and TCP port number than the host device 214. Since the router 226 and the host device 214 originally shared the same IP address, the router 226 must choose a different IP address (e.g., 200.12.22.32). Although not shown, the router 226 may be equipped with a list of one or more alternate IP addresses to choose from in the event that a host device wishes to connect with a server device that is not OBAR-enabled. Like the router 26, the router 226 has a chosen TCP port of 9000.

The new TCP-SYN packet 107 is identical to the TCP-SYN packet 101a, except that the IP header of the TCP-SYN packet 107 contains the source address of 200.12.22.32, the source port of 9000, the destination address of 250.40.50.60, and the destination port of 80. The router 226 forwards this TCP-SYN packet 107 to the server device 234, which in turn creates a new TCP/IP socket 68 for the connection between itself and the router 226. The unique quadruple of source-address/source-port/destination-address/destination-port that characterizes this new TCP/IP socket 68 created by the server device 234 is 250.40.50.60 (source address)/80 (source port)/200.12.22.32 (destination address)/9000 (destination port).

The server device 234 next sends a new TCP-SYN-ACK packet 108 to the router 226 to acknowledge the TCP transmission. The IP header of this TCP-SYN-ACK packet 108 contains the source address of 250.40.50.60, the source port of 80, the destination address of 200.12.22.32, and the destination port of 9000. The router 226 then receives the TCP-SYN-ACK packet 108 from the server device 234, and uses NAT to transform it into the TCP-SYN-ACK packet 102b. The TCP-SYN-ACK packet 102b is next forwarded by the router 226 to the host device 214.

The host device 214 then responds with the TCP-ACK packet 103a to acknowledge the TCP-SYN-ACK packet sent by the server device 234. Like the TCP-SYN packet 101a, the IP header of the TCP-ACK packet 103a contains the source address of 198.10.20.30, the source port of 1029, the destination address of 250.40.50.60, and the destination port of 80. The TCP-ACK packet 103a is intercepted by the router 226, however, which uses NAT to transform it into a TCP-ACK packet 109. The TCP-ACK packet 109 is identical to the TCP-ACK packet 103a, except that the IP header of the TCP-ACK packet 109 contains the source address of the router 226 (i.e., 200.12.22.32) and the source port of the router 226 (i.e., 9000), instead of the source address and the source port of the host device 214. The TCP-ACK packet 109 is then forwarded by the router 226 to the server device 234, and data is exchanged between the server device 234 and the host device 214 through the router 226 using NAT.

After the data exchange is finished, and assuming the host device 214 closes the TCP/IP session first, the host device 214 sends the TCP-FIN packet 104a to the server device 234 to initiate termination of the TCP/IP session. Once again, this TCP-FIN packet 104a is intercepted by the router 226, which uses NAT to transform the TCP-FIN packet 104a into a TCP-FIN packet 110. Like the TCP-SYN packet 107 and the TCP-ACK packet 109, the IP header of the TCP-FIN packet 110 contains the source address of 200.12.22.32, the source port of 9000, the destination address of 250.40.50.60, and the destination port of 80.

The router 226 next forwards the TCP-FIN packet 110 to the server device 234, which responds to the TCP-FIN packet by sending a TCP-FIN-ACK packet 111 to the router 226 to acknowledge receipt of the termination request. The IP header of this TCP-FIN-ACK packet 111 contains the source address of 250.40.50.60, the source port of 80, the destination address of 200.12.22.32, and the destination port of 9000. The router 226 receives the TCP-FIN-ACK packet 111 from the server device 234 and uses NAT to transform it into the TCP-FIN-ACK packet 105b. The router then forwards the TCP-FIN-ACK packet 105b to the host device 214. The TCP/IP session preferably ends when the host device 214 receives the TCP-FIN-ACK packet 105b.

The various embodiments of the present invention described above offer several advantages over the prior art. While the present invention still provides an IP address reuse technology that allows a local network to purchase a smaller block of external network addresses, thereby providing a cost savings for the local network, NAT and its large computational burden are no longer required with the present invention. In fact, with OBAR, only a mapping table on a router is required to assist the router in directing packets with OBAR IDs to the correct host device connected to the router. Since very little processing is done by an OBAR-enabled router, it scales relatively well, especially compared to routers using NAT. Similarly, an OBAR router requires only minor modifications and does not need to support multiple individual protocols like NAT routers.

Although minor modifications at the host-end may lessen the router's burden of creating and assigning OBAR IDs, unlike DNAT, only minor modifications to the TCP/IP stacks at the server-end are required for implementing OBAR. This is particularly advantageous given that most users of the host devices are inexperienced with making such modifications, especially those required by DNAT. In contrast, the OBAR modifications made to the server devices are typically made by more experienced network administrators.

In addition, OBAR can be applied with particular advantage to the services offered by an Internet Service Provider ("ISP"), where multiple host devices communicate with one or more server devices on an external network, rather than other host devices on the same network. That is not to say that host devices on an OBAR LAN cannot communicate with other host devices on the same OBAR LAN. To communicate with other host devices on the same OBAR LAN, a host device may use a different protocol that does not interfere with IP traffic, such as Internet Packet Exchange ("IPX"). Alternatively, each host device on the OBAR LAN may be multi-homed, with an unroutable internal IP address serving as its second address for communication with other host devices within the OBAR LAN.

Moreover, since OBAR IDs may be statically set by a network administrator for each host device within an OBAR LAN, external network devices may communicate with the host devices within an OBAR LAN by simply adding the OBAR ID of the host device they wish to communicate with to the IP header of their outgoing data packets. When the OBAR-enabled router of the OBAR LAN receives the data packet with the OBAR ID, the router simply removes the OBAR ID and directs the data packet to the appropriate host device of the OBAR LAN as described above.

Similarly, an external network device may access a server device behind an OBAR router as long as the external network device knows the OBAR ID of the server device. The typical Universal Resource Locator ("URL") format for a server device behind a non-OBAR router connected to the Internet is <protocol>://<server domain name>/<pathname>:<port number>. For example, if HyperText Transfer Protocol ("http") was used to access a port number of 81 and a pathname of "prices" on a server device with a domain name of "www.myisp.com," the URL format used would be "http://www.mysip.com/prices:81." If this server device was behind an OBAR-enabled router, however, the URL format would require only a simple extension to add the OBAR ID of the server device. The resulting URL format would be <protocol>://<server domain name>/<pathname>:<port number>:<OBAR ID>. Thus, in order to access this server device behind the OBAR router, assuming the server device had an OBAR ID of 6, an external network device would simply use the URL format of "http://www.mysip.com/prices:81:6."

Those skilled in the art to which the invention pertains may make modifications and other embodiments employing the principles of this invention without departing from its spirit or essential characteristics, particularly upon considering the foregoing teachings. For instance, the router 38 of the third computer network 32 may also be OBAR-enabled. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A network system for an options based address reuse comprising:
    a first network having a host device with a host address and a host port;
    a second network external to the first network, the second network having a server device; and
    a combination network address for identifying the host device to the server device, the combination network address including the host address, the host port, and an option identifier.

2. The network system of claim 1 wherein the host address is an Internet Protocol address.

3. The network system of claim 1 further comprising a common external network address for identifying the first network to the second network, and wherein the first network further includes a router with a router address that is the same as both the common external network address and the host address.

4. The network system of claim 3 wherein the host address, the router address, and the common external network address are all the same Internet Protocol address.

5. The network system of claim 1 wherein the first network further includes a router for forming the combination network address by adding the option identifier to the host address and the host port of the host device.

6. The network system of claim 1 wherein the host device forms the combination network address by adding the option identifier to the host address and the host port.

7. The network system of claim 1 wherein the host device also has an internal network identifier, and the first network further includes a router with a mapping table, the mapping table having a first column for recording the internal network identifier of the host device, and a second column for recording the option identifier of the combination network address.

8. The network system of claim 7 wherein the internal network identifier is a Media Access Control address.

9. The network system of claim 1 wherein the server device has a server address and a server port, and the server device is capable of creating a socket for communication between the server device and the host device, the socket including a source address the same as the server address, a source port the same as the server port, a destination address the same as the host address, a destination port the same as the host port, and the option identifier.

10. The network system of claim 1 wherein the server device has a server address and a server port, and the server device is capable sending a packet including a source address the same as the server address, a source port the same as the server port, a destination address the same as the host address, a destination port the same as the host port, and the option identifier.

11. The network system of claim 1 wherein the option identifier has a format with a type field, a length field for specifying a byte length of the option identifier, and a data field.

12. The network system of claim 11 wherein the length field is 8 and the data field is an integer.

13. The network system of claim 11 wherein the length field is 8 and the data field is an Internet Protocol address.

14. A network system for an options based address reuse comprising:
    a first network having a host device with a host address and a host port, and a router; and
    a second network external to the first network, the second network having a server device;
    wherein the router forms a combination network address for identifying the host device to the server device, the combination network address including the host address, the host port, and an option identifier.

15. A network system for an options based address reuse comprising:
    a first network having a host device with a host address and a host port; and
    a second network external to the first network, the second network having a server device;
    wherein the host device forms a combination network address for identifying the host device to the server device, the combination network address including the host address, the host port, and an option identifier.

16. A network system for an options based address ruse comprising:
    a first network having a host device with a host address and a host port, and a router, the router being capable of using network address translation;
    a second network external to the first network, the second network having a server device; and
    a combination network address for identifying the host device to the server device, the combination network address including the host address, the host port, and an option identifier.

17. A method of options based address reuse comprising the steps of:
    providing a first network having a router and a host device, the host device having a host address, a host port, and an internal network identifier;
    providing a second network external to the first network, the second network having a server device with a server address and a server port;
    sending a first packet from the host device to the server device through the router; and
    adding an option identifier to the first packet.

18. The method of claim 17 further comprising the steps of recording the internal network identifier in a first column of a mapping table on the router, and recording the option identifier in a second column of the mapping table.

19. The method of claim 17 further comprising the steps of adding the option identifier to a second packet at the server device, and sending the second packet from the server device to the host device through the router.

20. The method of claim 17 further comprising the step of creating a socket at the server device including a source address the same as the server address, a source port the same as the server port, a destination address the same as the host address, a destination port the same as the host port, and the option identifier.

21. The method of claim 17 further comprising the step of adding the option identifier to the first packet at the router.

22. The method of claim 21 further comprising the steps of recording the internal network identifier in a first column of a mapping table on the router, and recording the option identifier in a second column of the mapping table.

23. The method of claim 21 further comprising the steps of adding the option identifier to a second packet at the server device, and sending the second packet from the server device to the host device through the router.

24. The method of claim 23 further comprising the step of removing the option identifier from the second packet at the router.

25. The method of claim 21 further comprising the step of creating a socket at the server device including a source address the same as the server address, a source port the same as the server port, a destination address the same as the host address, a destination port the same as the host port, and the option identifier.

26. The method of claim 17 further comprising the step of adding the option identifier to the first packet at the host device.

27. The method of claim 26 further comprising the steps of recording the internal network identifier in a first column of a mapping table on the router, and recording the option identifier in a second column of the mapping table.

28. The method of claim 26 further comprising the steps of adding the option identifier to a second packet at the server device, and sending the second packet from the server device to the host device through the router.

29. The method of claim 26 further comprising the step of creating a socket at the server device including a source address the same as the server address, a source port the same as the server port, a destination address the same as the host address, a destination port the same as the host port, and the option identifier.

30. The method of claim 17 further comprising the steps of sending a second packet from the server device to the host device through the router, and using network address translation at the router to deliver the second packet to the host device.

* * * * *